(12) United States Patent
Friesen et al.

(10) Patent No.: US 9,725,869 B2
(45) Date of Patent: Aug. 8, 2017

(54) BUILDING ASSEMBLY FOR GREENHOUSES AND OTHER BUILDINGS

(71) Applicants: Kenneth Kyle Friesen, Leamington (CA); John Friesen, Leamington (CA)

(72) Inventors: Kenneth Kyle Friesen, Leamington (CA); John Friesen, Leamington (CA)

( * ) Notice: Subject to any disclaimer, the term of this patent is extended or adjusted under 35 U.S.C. 154(b) by 10 days.

(21) Appl. No.: 14/667,996

(22) Filed: Mar. 25, 2015

(65) Prior Publication Data

US 2015/0275503 A1  Oct. 1, 2015

Related U.S. Application Data

(60) Provisional application No. 61/970,392, filed on Mar. 26, 2014.

(51) Int. Cl.
| | |
|---|---|
| *E02D 27/32* | (2006.01) |
| *A01G 9/14* | (2006.01) |
| *E04H 5/08* | (2006.01) |
| *E04B 1/344* | (2006.01) |

(52) U.S. Cl.
CPC ............... *E02D 27/32* (2013.01); *A01G 9/14* (2013.01); *E04B 1/344* (2013.01); *E04H 5/08* (2013.01)

(58) Field of Classification Search
CPC ....... E02D 27/32; E04B 1/344; E04B 1/3442; E04B 1/34357; E04B 1/34384; E04B 1/3444; A01G 9/14; E04H 5/08; E04C 3/005; Y10T 16/545; Y10T 16/5453
USPC ......... 52/69, 71, 79.5, 645, 646; 348/3–4, 7, 348/21–22, 95, 129, 192, 296, 396
See application file for complete search history.

(56) References Cited

U.S. PATENT DOCUMENTS

| | | | | |
|---|---|---|---|---|
| 4,219,982 A | * | 9/1980 | Hart | E04B 1/3447 52/641 |
| 4,362,295 A | * | 12/1982 | Ford | B27B 17/0075 269/287 |
| 4,848,048 A | * | 7/1989 | Mairlot | A01G 9/1476 52/222 |
| 5,655,335 A | * | 8/1997 | Vermeer | A01G 9/14 47/17 |
| 5,735,100 A | * | 4/1998 | Campbell | E04B 1/3447 52/126.6 |
| 6,766,623 B1 | * | 7/2004 | Kalnay | E04B 1/34305 135/128 |
| 8,091,288 B2 | * | 1/2012 | Van Dijk | A01G 9/14 47/17 |
| 2004/0049975 A1 | * | 3/2004 | Van Der Heijden | A01G 9/241 47/17 |
| 2008/0083189 A1 | * | 4/2008 | Dulac | E04B 1/3445 52/646 |
| 2014/0157714 A1 | * | 6/2014 | Richardson | E04B 1/1903 52/646 |

FOREIGN PATENT DOCUMENTS

| | | | | |
|---|---|---|---|---|
| EP | | 2430909 A1 | * 3/2012 | |
| NL | EP | 2430909 A1 | * 3/2012 | ............... A01G 9/14 |

* cited by examiner

*Primary Examiner* — Brian Glessner
*Assistant Examiner* — Adam Barlow
(74) *Attorney, Agent, or Firm* — Carlson, Gaskey & Olds

(57) ABSTRACT

This disclosure relates to a building assembly including a first upright, a first pivot mechanism, a second pivot mechanism, a first structure, and a second structure. The first upright is pivotally movable with the first pivot mechanism relative to the first structure. The first upright is also pivotally movable with the second pivot mechanism relative to the second structure.

20 Claims, 4 Drawing Sheets

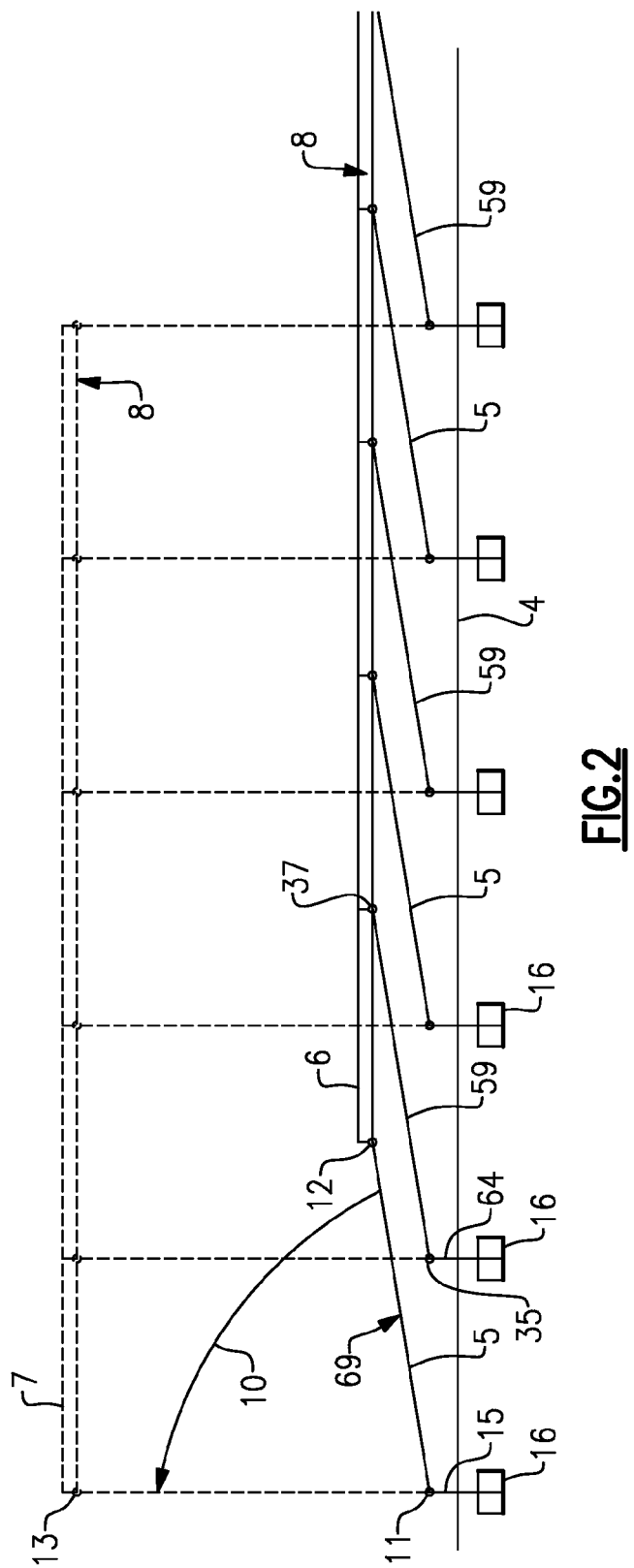

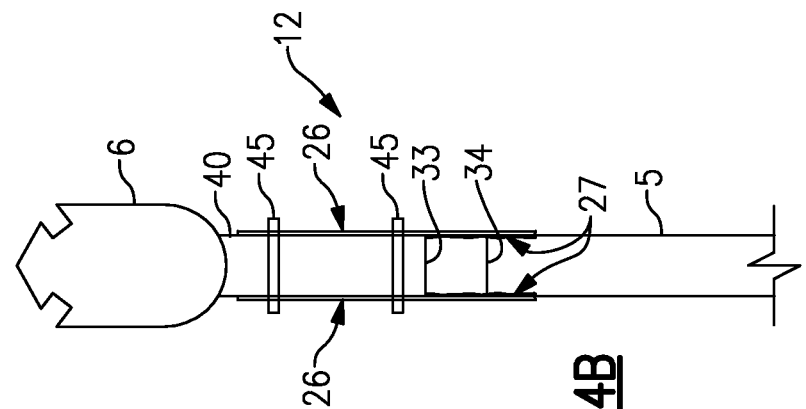
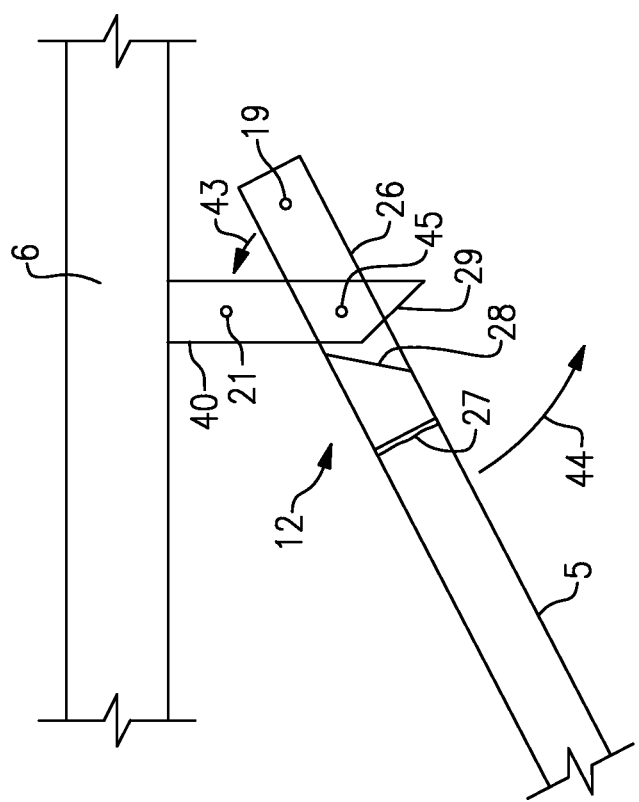
FIG.4B
FIG.4A

BUILDING ASSEMBLY FOR GREENHOUSES AND OTHER BUILDINGS

CROSS REFERENCE TO RELATED APPLICATIONS

This application claims priority to U.S. Provisional Application No. 61/970,392, which was filed on Mar. 26, 2014.

BACKGROUND

This disclosure relates to a building assembly. The building assembly may be constructed at ground level and includes pivoting structural uprights for pivoting the building assembly from the ground level to an upright position.

Traditionally, building assemblies are erected at heights using scissor lifts and ladders. Other heavy machinery may also be needed to erect the building assembly. This increases the amount of time necessary for constructing the building assembly and also increases construction costs.

SUMMARY

A building assembly according to an exemplary aspect of the present disclosure includes, among other things, a first upright, a first pivot mechanism configured to pivot the first upright relative to a first structure and a second pivot mechanism configured to pivot the first upright relative to a second structure.

In a further non-limiting embodiment of the foregoing assembly, the building assembly is part of a greenhouse.

In a further non-limiting embodiment of either of the foregoing assemblies, the first structure is a ground post.

In a further non-limiting embodiment of any of the foregoing assemblies, the second structure is a gutter, brace or post.

In a further non-limiting embodiment of any of the foregoing assemblies, a second upright includes a third pivot mechanism configured to pivot the second upright relative to a third structure and a fourth pivot mechanism configured to pivot the second upright relative to the second structure.

In a further non-limiting embodiment of any of the foregoing assemblies, the first upright and the second upright are connected to form an interconnected pivoting parallelogram.

In a further non-limiting embodiment of any of the foregoing assemblies, the first upright and the second upright are connected by a truss.

In a further non-limiting embodiment of any of the foregoing assemblies, the first pivot mechanism and the second pivot mechanism include at least one of a pin, rod, shaft, bolt, bushing, sleeve and rotary coupling.

In a further non-limiting embodiment of any of the foregoing assemblies, at least one of the first pivot mechanism and the second pivot mechanism includes a hinge plate.

In a further non-limiting embodiment of any of the foregoing assemblies, a truss is connected to the first upright or to an upper post.

In a further non-limiting embodiment of any of the foregoing assemblies, at least one of the first pivot mechanism and the second pivot mechanism include a hinge plate that is welded to the first upright.

In a further non-limiting embodiment of any of the foregoing assemblies, the first structure is a ground post that includes a concrete foot, a cement footing or an anchoring system.

A method for erecting a building assembly according to another exemplary aspect of the present disclosure includes, among other things constructing a frame structure at a ground level and pivoting the frame structure from the ground level to an upright position.

In a further non-limiting embodiment of the foregoing method, the frame structure is part of a greenhouse.

In a further non-limiting embodiment of either of the foregoing methods, the constructing step includes pivotally connecting a first upright of the frame structure to a ground post or anchoring system.

In a further non-limiting embodiment of any of the foregoing methods, the constructing step includes pivotally connecting a first upright of the frame structure to a gutter, brace, post, structure or roof components.

In a further non-limiting embodiment of any of the foregoing methods, the constructing step includes pivotally connecting a second upright of the frame structure to a second ground post or anchoring system.

In a further non-limiting embodiment of any of the foregoing methods, the constructing step includes connecting the first upright to the second upright to form an interconnected pivoting parallelogram.

In a further non-limiting embodiment of any of the foregoing methods, the pivoting step includes pivoting a first upright of the frame structure about a first pivot mechanism and a second pivot mechanism.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 is a perpendicular perspective view of the building assembly of FIG. 1.

FIG. 4A illustrates an example pivoted position of an upright of a building assembly in connection with a second structure.

FIG. 4B illustrates an example upright position of an upright of a building assembly in connection with a second structure and is perpendicular in perspective to that of FIG. 4A.

DETAILED DESCRIPTION

Figure 1:
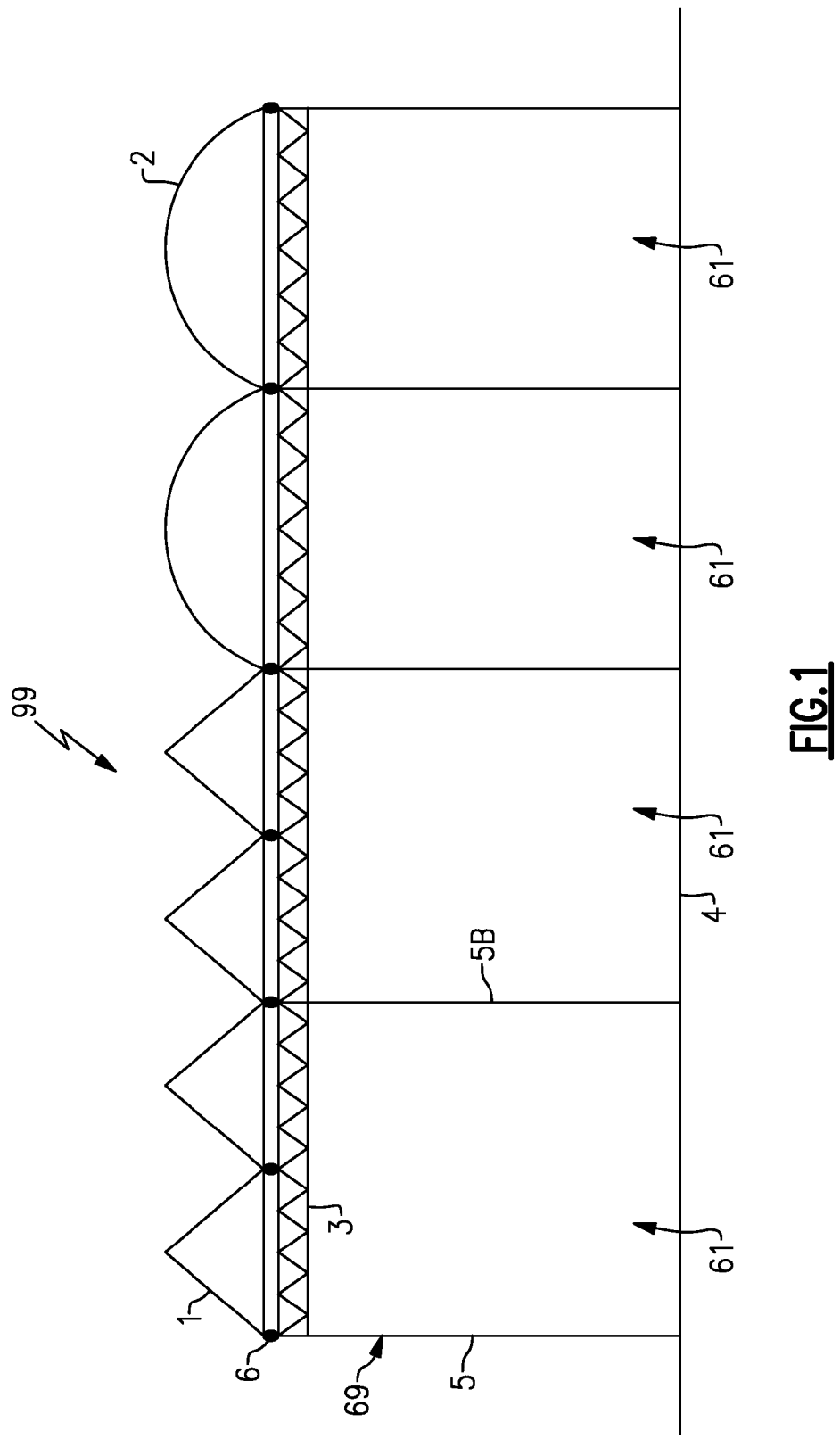
FIG. 1 illustrates an example building assembly.

FIG. 1 illustrates an example building assembly 99 that can be constructed at a ground level 4. The building assembly 99 may include a frame structure 69 having a first upright 5 connected with a second upright 5B by a truss 3. A bay 61 is formed by multiple combinations of the first upright 5 and the second upright 5B in connection with the ground level 4 and the truss 3 adjacent to a second structure 6, such as a rain gutter. The bay 61 may be of any size and may contain any number of frames and roofs. In one non-limiting example, the bays 61 are part of a greenhouse structure. However, other structures are also contemplated within the scope of this disclosure.

The building assembly 99 may include different types of roofs. In one example, the building assembly 99 may include a peaked roof 1. In another example, the building assembly 99 may include a hoop roof 2. In a multi-span building assembly, each bay 61 may be interconnected and may include the second structures 6 in between each of the roofs 1, 2 for the entire length of the bays 61.

The first upright 5 and the second upright 5B may be assembled at the ground level 4. The trusses 3 are installed across the rows of bays 61. Once each bay 61 is assembled, all of the components are raised, such as by pivoting, in a sectional fashion to erect the building assembly 99. The trusses 3 may be installed across the bays 61 along with other upper components.

Two rows of uprights 5, 5B side-by-side connected with trusses 3 form the bays 61. In one example, the connecting truss 3 is at the top portion of the first and second uprights 5, 5B. In another example, the connecting truss 3 is at the bottom portion of the first and second upper posts 40 (see FIG. 4A). The rows of bays 61 and their components may be of any size, material, wall thickness, and may contain any number of uprights 5, 5B, upper posts, ground posts, trusses 3 and/or bracing components, as discussed in greater detail below.

FIG. 2 illustrates a frame structure 69 (i.e., a row of uprights) at the ground level 4 prior to pivoting the frame structure 69 to erect a portion of the building structure 99 of FIG. 1. A first upright 5 of the frame structure 69 may be pivotally connected to a first structure 15 by a first pivoting mechanism 11. In one example, the first structure 15 is a ground post of the frame structure 69. The first pivoting mechanism 11 can include, but is not limited to, a pin, rod, shaft, bolt and/or other components. The first structure 15 has a footing 16 disposed below the ground level 4. The footing 16 may be made of a concrete, cement material, or a ground anchoring system, in some examples. Similarly, the first upright 5 is pivotally connected to a second structure 6 by a second pivoting mechanism 12. In one example, the second structure 6 is a gutter, brace, or roof components.

In one example in a down or unlocked position in which spacing is tight or relatively close together, the first upright 5 extends over top of a third structure 64, which may be another ground post in one example. The third structure 64 also has a footing 16 below the ground level 4. The second upright 59 may be pivotally connected to the third structure 64 by a third pivoting mechanism 35 and may be pivotally connected to the second structure 6 by a fourth pivoting mechanism 37. This pattern may continue to provide the frame structure 69 with a desired total bay or structure length.

The first uprights 5 and the second uprights 59 may be interconnected by the second structure 6 and/or bracing 8 to form interconnected pivoting parallelograms. Each parallelogram may pivot in the direction of arrow 10 to an upright position as indicated by the dashed lines. The position of the second pivoting mechanism 12 is shown in the locked or upright position as feature 13. Similarly, the position of the second structure 6 is indicated in the upright position as feature 7. Additional bracing 8 may be positioned from one upper pivot point to another upper pivot point and/or upper post to upper post throughout the row of uprights 5, 59 to reduce strain on the second structure 6. The bracing 8 may run perpendicular to the exemplified trusses 3 (see FIG. 1) or may be used in the place of the trusses 3 if trusses 3 are not structurally required.

Figure 3A:
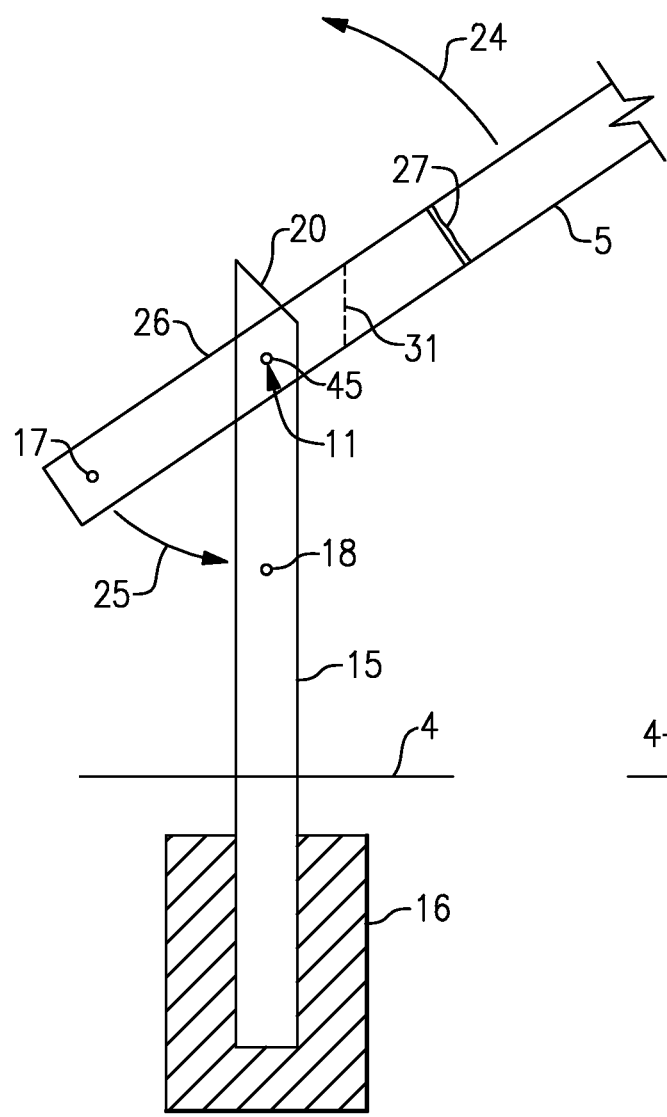
FIG. 3A illustrates an example pivoted position of an upright of a building assembly in connection with a first structure.
Figure 3B:
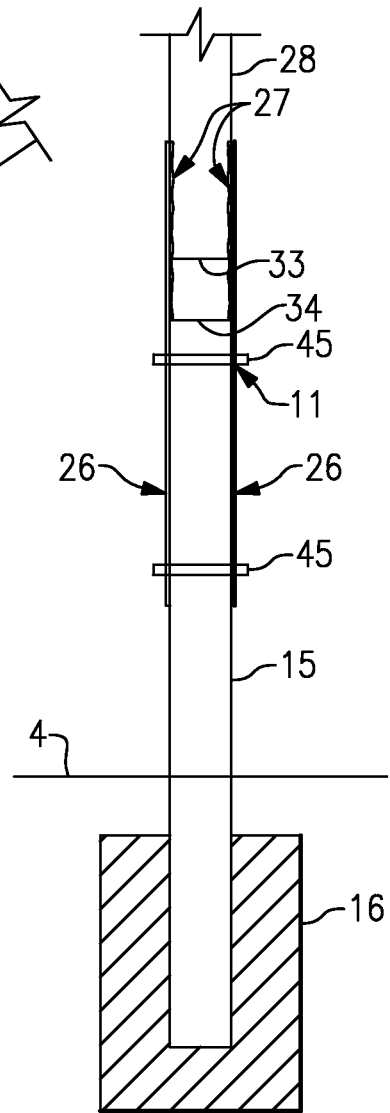
FIG. 3B illustrates an example upright position of an upright of a building assembly in connection with a first structure and is perpendicular in perspective to that of FIG. 3A.

The first pivoting mechanism 11 is shown in greater detail in FIGS. 3A and 3B. In one example, the first upright 5 is connected with hinge plates 26 on each side of the first upright 5 by one or more welds 27. The first structure 15 may also be connected with hinge plates 26 on each side of the first structure 15 by one or more welds.

The first upright 5 is pivotally movable using the first pivoting mechanism 11 to a lockable or upright position relative to the first structure 15. A top portion 20 of the first structure 15 and a bottom portion 31 of the first upright 5 may be cut equally at opposite angles to prevent further movement once the first upright 5 and the first structure 15 pivots to a lockable or upright position in the direction of arrow 24 and arrow 25. Once in the lockable or upright position shown in FIG. 3B, an opening 17 on the hinge plates 26 will substantially line up with an opening 18 on first structure 15 for fastening the components together. In doing so, the first upright 5 and the hinge plates 26 will be fastened together with the first structure 15 via fasteners 45. The fasteners 45, in this example, may include at least one of a pin, rod, shaft, or bolt. In the unlocked or down position, the first upright 5 pivots relative to the first structure 15 about the pivot point or fastener 45.

FIGS. 3A and 3B illustrate but one non-limiting example of the first pivoting mechanism 11. It should be appreciated that any pivoting or hinging mechanism including but not limited to any number of pins, rods, shafts, bolts, bushings, sleeves and rotary couplings can be utilized. The hinging mechanisms can be used in conjunction with each other and/or with complimenting welds to achieve additional structural strength. Similarly, seams 33 and 34 may be welded or sealed to secure the first upright 5 and the first structure 15 for additional structural strength and can also be used to seal liquid inside of the first upright 5 if the first upright 5 is used as a downspout to channel water from other structures. The first upright 5 could also be completely welded to the hinge plates 26 for additional structural strength and additional sealing.

The second pivoting mechanism 12 is shown in greater detail in FIGS. 4A and 4B. The first upright 5 may be pivotally movable relative to an upper post 40 using the second pivoting mechanism 12. The upper post 40, when applied in configuration, may be connected to the second structure 6. In one example, the upper post 40 may be welded, bolted or screwed to the second structure 6. In another example, an intermediate coupler or couplers may be fastened to all or any of the upper post 40, the second structure 6, the upright 5, or the second pivoting mechanism 12 by means of welding, bolting, screwing etc.

In one example, the first upright 5 is connected with hinge plates 26 on each side of the first upright 5 by one or more welds 27. Likewise, the upper post 40 may also be connected with hinge plates 26 on each side of the upper post 40. A top portion 28 of the first upright 5 and a bottom portion 29 of the upper post 40 may be cut equally at opposite angles to prevent further movement once the first upright 5 and the second structure 6 pivots to a lockable or upright position in the direction of arrow 43 and arrow 44. Once in the locked position shown in FIG. 4B, an opening 19 on the hinge plates 26 will substantially align with an opening 21 on the upper post 40 and may be fastened together. In doing so, the first upright 5 and the hinge plates 26 will be fastened together with the upper post 40 using fasteners 45. The fasteners 45 may include at least one of a pin, rod, shaft, bolt, bushing, sleeve and/or rotary coupling. In the unlocked position, the first upright 5 pivots relative to the upper post 40 about the pivot point or fastener 45.

FIGS. 4A and 4B illustrate but one non-limiting example of the second pivoting mechanism 12. It should be noted that any number of pins, rods, shafts, bolts, bushings, sleeves and rotary couplings can be utilized in conjunction with each other and/or to complement one another to form a hinging or pivoting mechanism. The hinging mechanism can be used with complimentary welds to achieve additional structural strength. Seams 33 and 34 may be welded or sealed to secure the first upright 5 and the upper post 40 for additional structural strength and can also be used to seal liquid out of the first upright 5 if used as a downspout to channel water away from the second structure 6. The first upright 5 may be completely welded to the hinge plates 26 for additional structural strength and additional sealing.

In another example, the first upright 5 may be used as a downspout for the second structure 6. An opening may be cut or drilled downstream of the second structure 6 where the upper post 40 or the coupler of the upper post 40 would be fitted to allow a free flow of liquid to be directed into the first upright 5.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A building assembly, comprising:
   a first upright including a first angled surface;
   a first structure including a second angled surface;
   a first non-translating pivot mechanism configured to pivot the first upright relative to the first structure such that the first angled surface abuts the second angled surface when the first upright is pivoted to an upright position;
   a second structure;
   a second non-translating pivot mechanism configured to pivot the first upright relative to the second structure; and
   a fastener spaced from the first pivot mechanism and extending through the first structure to lock a positioning of the first upright relative to the first structure.

2. The assembly of claim 1, wherein the building assembly is part of a greenhouse.

3. The assembly of claim 1, wherein the first structure is a ground post.

4. The assembly of claim 1, wherein the second structure is a gutter, brace or post.

5. The assembly of claim 1, comprising a second upright including a third pivot mechanism configured to pivot the second upright relative to a third structure and a fourth pivot mechanism configured to pivot the second upright relative to the second structure.

6. The assembly of claim 5, wherein the first upright and the second upright are connected to form an interconnected pivoting parallelogram.

7. The assembly of claim 6, wherein the first upright and the second upright are connected by a truss.

8. The assembly of claim 1, wherein the first pivot mechanism and the second pivot mechanism include at least one of a pin, rod, shaft, bolt, bushing, sleeve and rotary coupling.

9. The assembly of claim 1, wherein at least one of the first pivot mechanism and the second pivot mechanism includes a hinge plate.

10. A building assembly, comprising:
    a first upright including a first angled surface;
    a first structure including a second angled surface;
    a first pivot mechanism configured to pivot the first upright relative to the first structure such that the first angled surface abuts the second angled surface when the first upright is pivoted to an upright position;
    a second structure;
    a second pivot mechanism configured to pivot the first upright relative to the second structure;
    a fastener spaced from the first pivot mechanism and extending through the first structure to lock a positioning of the first upright relative to the first structure; and
    wherein a truss is connected to the first upright or to an upper post.

11. The assembly of claim 1, wherein at least one of the first pivot mechanism and the second pivot mechanism include a hinge plate that is welded to the first upright.

12. A method for erecting a building assembly, comprising:
    constructing a frame structure at a ground level including pivotally connecting a first upright of the frame structure to a ground post and pivotally connecting the first upright to a gutter or roof component;
    pivoting the frame structure from the ground level to an upright position, such that the first upright is substantially perpendicular to the ground level; and
    locking the first upright to the ground post by inserting a fastener through the ground post.

13. The method of claim 12, wherein the frame structure is part of a greenhouse.

14. The method of claim 12, wherein the constructing step includes pivotally connecting a second upright of the frame structure to a second ground post or anchoring system.

15. The method of claim 14, wherein the constructing step includes connecting the first upright to the second upright to form an interconnected pivoting parallelogram.

16. A method for erecting a building assembly, comprising:
    constructing a frame structure at a ground level including pivotally connecting a first upright of the frame structure to a ground post and pivotally connecting the first upright to a gutter or roof component;
    pivoting the frame structure from the ground level to an upright position, including pivoting a first upright of the frame structure about a first pivot mechanism and a second pivot mechanism; and
    locking the first upright to the ground post by inserting a fastener through the ground post.

17. The assembly of claim 1, wherein the second pivot mechanism is mounted to an upper post that extends from the second structure.

18. The assembly of claim 1, comprising a hinge plate mounted to at least one of the first structure and the first upright, and the fastener extends through the hinge plate and the first structure to lock the positioning of the first upright relative to the first structure.

19. The assembly of claim 1, wherein the second angled surface is at a top portion of the first structure and the first angled surface is at a bottom portion of the first upright, the angled surfaces configured to prevent further movement of the first upright relative to the first structure when the first upright is in the upright position.

20. A building assembly, comprising:
   a ground post including a first angled surface;
   a first upright pivotally connected to the ground post near a first end of the first upright, the first upright having a second angled surface near the first end, such that the second angled surface abuts the first angled surface when the first upright is in an upright position;
   a first pivot mechanism configured to pivotally connect the first upright relative to the ground post;
   an upper post pivotally connected to said first upright near a second end of the first upright;
   a second pivot mechanism configured to pivotally connect the first upright relative to the upper post; and
   a gutter or roof component connected to the upper post.

\* \* \* \* \*